(12) United States Patent
Rose et al.

(10) Patent No.: US 8,788,766 B2
(45) Date of Patent: Jul. 22, 2014

(54) SOFTWARE-ACCESSIBLE HARDWARE SUPPORT FOR DETERMINING SET MEMBERSHIP

(75) Inventors: John R. Rose, San Jose, CA (US); Lawrence A. Spracklen, Boulder Creek, CA (US); Zoran Radovic, San Jose, CA (US)

(73) Assignee: Oracle America, Inc., Redwood Shores, CA (US)

( * ) Notice: Subject to any disclaimer, the term of this patent is extended or adjusted under 35 U.S.C. 154(b) by 718 days.

(21) Appl. No.: 12/708,376

(22) Filed: Feb. 18, 2010

(65) Prior Publication Data

US 2011/0202725 A1    Aug. 18, 2011

(51) Int. Cl.
*G06F 12/00*    (2006.01)
*G06F 13/00*    (2006.01)
*G06F 13/28*    (2006.01)

(52) U.S. Cl.
USPC ................ 711/156; 711/4; 711/118; 707/754

(58) Field of Classification Search
USPC ............................... 711/4, 156, 118; 707/754
See application file for complete search history.

(56) References Cited

U.S. PATENT DOCUMENTS

| 8,018,940 B2 * | 9/2011 | Hao et al. ....................... 370/392 |
| 2002/0023201 A1 * | 2/2002 | Saulsbury et al. ............ 712/225 |
| 2008/0147714 A1 * | 6/2008 | Breternitz et al. ............ 707/102 |
| 2011/0055489 A1 * | 3/2011 | Reddy et al. .................. 711/141 |

OTHER PUBLICATIONS

Sarang Dharmapurikar, Praveen Krishnamurthy, Todd Sproull, and John Lockwood, "Deep Packet Inspection using Parallel Bloom Filters", IEEE Computer Society Press, vol. 24-1, Jan. 2004, pp. 52-61.
Burton H. Bloom, "Space/Time Trade-offs in Hash Coding with Allowable Errors", Communications of the ACM, vol. 13-7, Jul. 1970, pp. 422-426.
M. Breternitz, Gabriel H. Loh, Bryan Black, Jeffrey Rupley, Peter G. Sassone, Wesley Attrot, and Youfeng Wu, "A Segmented Bloom Filter Algorithm for Efficient Predictors", In the Proceedings of the International Symposium on Computer Architecture and High Performance Computing, Nov. 2008, 8 pages.

* cited by examiner

*Primary Examiner* — Stephen Elmore
*Assistant Examiner* — Mark Giardino, Jr.
(74) *Attorney, Agent, or Firm* — Meyertons, Hood, Kivlin, Kowert & Goetzel, P.C.

(57) ABSTRACT

A method and processor supporting architected instructions for tracking and determining set membership, such as by implementing Bloom filters are disclosed. The apparatus includes storage arrays (e.g., registers) and an execution core configured to store an indication that a given value is a member of a set, including by executing an architected instruction having an operand specifying the given value, wherein executing comprises applying a hash function to the value to determine an index into one of the storage arrays and setting a bit of the storage array corresponding to the index. An architected query instruction is later executed to determine if a query value is not a member of the set, including by applying the hash function to the query value to determine an index into the storage array and determining whether a bit at the index of the storage array is set.

15 Claims, 10 Drawing Sheets

US 8,788,766 B2

SOFTWARE-ACCESSIBLE HARDWARE SUPPORT FOR DETERMINING SET MEMBERSHIP

BACKGROUND

Today's computer systems are constantly being pushed to achieve ever-greater system performance. Computer engineers and software developers leverage a variety of techniques and approaches to increase performance. For example, software engineers may expend considerable effort optimizing computer code by utilizing space-efficient and/or time-efficient data structures and algorithms for solving particular computing problems. Research into general solutions (e.g., data structures, algorithms) aimed at solving commonly arising software problems has been prolific, though more solutions are regularly needed as new problems arise.

One problem that commonly arises when implementing software systems is that of quickly testing set membership. For example, a software system may be configured to observe a series of values over time and then, given a query value, the system may determine whether the query value was among the observed values (i.e., whether the query value is a member of the set of observed values).

This general challenge of testing set membership arises in many situations. For example, in software transactional memory systems (STMs), a processor may receive cache coherency message (i.e., probes) from other processors, each message concerning a respective position in shared memory. In response to receiving such a message, an STM may need to determine whether an uncommitted transaction being executed by the processor has accessed a memory position indicated by a received probe. Because this determination is a common task in STMs, it is desirable to quickly determine whether the received probe indicates a memory position in the access set of the executing transaction.

In other examples of testing set membership, a web server may need to determine whether it has previously served a webpage corresponding to a given URL or a garbage collector may need to quickly determine whether a given block of memory is still alive. Many other examples exist.

One solution to determining set membership is to employ a "Bloom filter", a probabilistic data structure for testing set memberships. A Bloom filter allows false positives but not false negatives. That is, Bloom filter may only definitively conclude that a given element is not in the set of observed elements, but not that it is in the set. However, this guarantee is sufficient for many scenarios.

Software-implemented Bloom filters are often used by software applications to determine set membership in a time-efficient and/or space-efficient manner. Therefore, it may be desirable for Bloom filter implementations themselves to be highly efficient. However, traditional Bloom filters are implemented using only software constructs and in-memory data structures.

SUMMARY

A method and processor supporting architected instructions for tracking and determining set membership, such as by implementing one or more Bloom filters, is disclosed. The apparatus includes storage arrays (e.g., registers, cache), each comprising a plurality of bits, and an execution core configured to store an indication that a given value is a member of a set. Storing the indication includes executing an architected instruction having an operand specifying the given value, including by applying a hash function to the value to determine an index into one of the storage arrays. A bit of the storage array at a position of the storage array corresponding to the determined index is then set.

In some embodiments, an architected instruction may both apply the hash function and set the corresponding bit in the target storage array, and a number of instances of the architected instruction may be executed as part of the insert, each specifying a respective storage array.

In other embodiments, a first architected instruction may calculate a plurality of indices and store them in an index array. A second instruction (or set of instructions) may then set one or more bits in a target storage array that correspond to one or more of the indices.

The apparatus may determine whether a given query value is not a member of the set, including by executing an architected query instruction. Determining whether a query value is a member of the set includes applying the hash function to the query value to determine a query index into the storage array and determining whether a bit at the query index is set.

In some embodiments, an architected instruction may both apply the hash function and check the corresponding bit in the target storage array, and a number of instances of the architected instruction may be executed as part of the query, each specifying a respective one of the storage arrays used for insert. If any of the checked bits is not set, then the apparatus determines that the value is not a member of the set.

In other embodiments, a first architected instruction may calculate a plurality of indices and store them in an index array. A set of one or more subsequent instructions may then check, for each index in the index array, whether a corresponding bit in one or more target storage arrays is set. If any of the bits are not set, the apparatus may determine that the query value is not a member of the set.

Any headings used herein are for organizational purposes only and are not meant to limit the scope of the description or the claims. As used herein, the word "may" is used in a permissive sense (i.e., meaning having the potential to) rather than the mandatory sense (i.e. meaning must). Similarly, the words "include", "including", and "includes" mean including, but not limited to.

DETAILED DESCRIPTION OF EMBODIMENTS

Bloom filters implemented in software are often used by software applications for determining set membership in a time-efficient and/or space-efficient manner. For example, a series of values may each be inserted into the Bloom filter (such as with an insert operation) and the filter may then be queried for a given value. The result of the query may definitively confirm that the given value was not among the inserted series of values or else, that the given value may potentially have been among the inserted series. It is often desirable for Bloom filter implementations to be highly efficient.

According to various embodiments, a processor and/or memory subsystem may provide hardware-level support for tracking and determining set membership, such as by creating and interacting with Bloom filters in a highly efficient manner. In some embodiments, an instruction set architecture (ISA) may provide one or more instructions for inserting values into a Bloom filter and/or for querying that Bloom filter to determine set membership. As used herein, the term architected instruction refers to an instruction defined by a processor's ISA and executable by the processor. In various embodiments, these instructions may be executable by the processor to operate on various storage arrays of the processor (e.g., floating point register, integer register, on-chip data cache, dedicated memory, etc.) and/or on higher-level caches.

Figure 1:
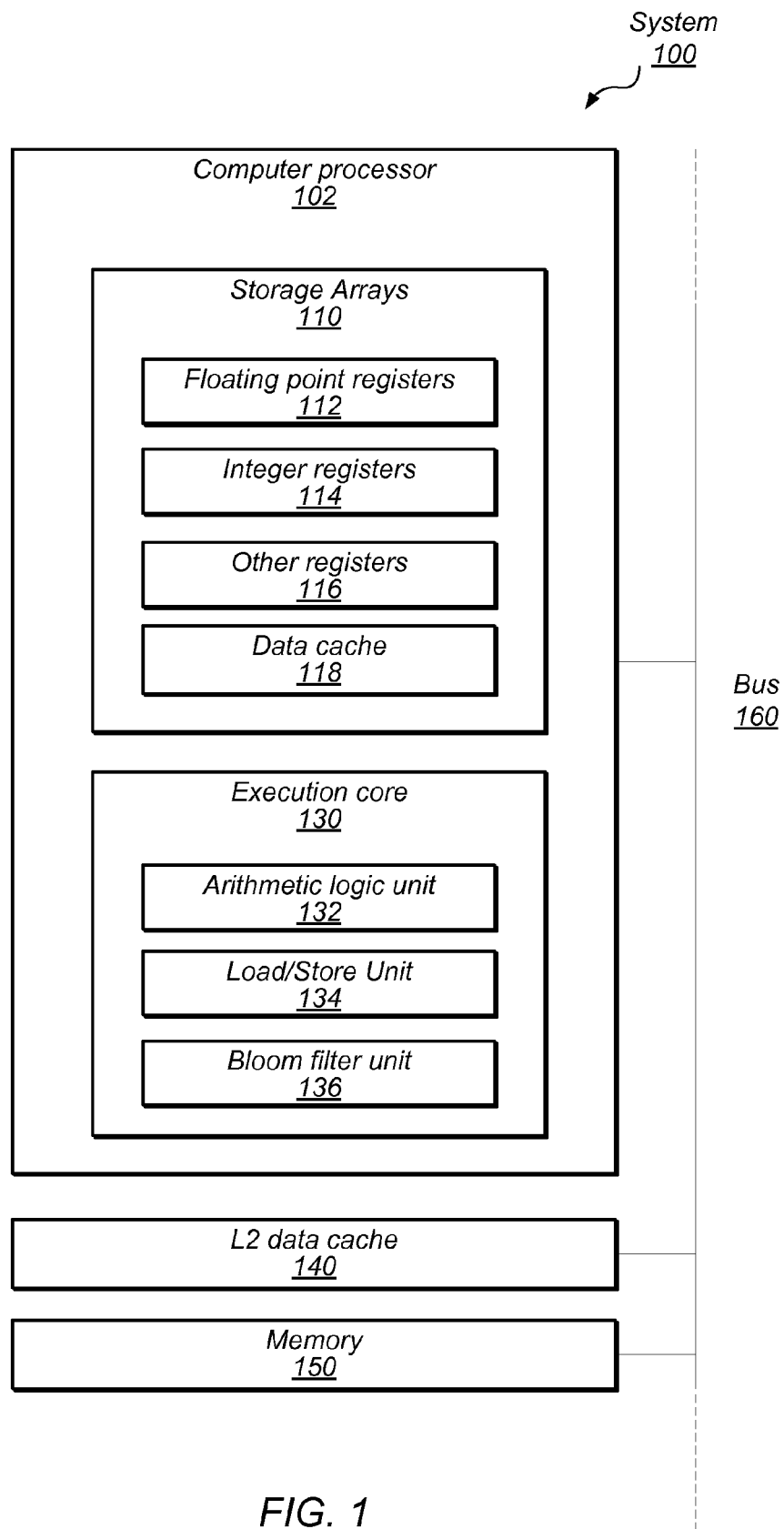
FIG. 1 is a block diagram illustrating the various components of a system configured to implement hardware support for testing set membership, according to some embodiments.

FIG. 1 is a block diagram illustrating the various components of a system configured to implement hardware support for testing set membership, according to some embodiments. In the illustrated embodiment, system 100 comprises computer processor 102, L2 data cache 140, and Memory 150. These components are coupled together with bus 160, which may be any of various types of interconnects.

According to the illustrated embodiment, computer processor 102 includes any number of storage arrays 110 and one or more execution cores 130. Storage arrays 110 may include any number of various types of storage where the processor may store information. Each storage array may comprise a series of bits, each with a respective position within the array.

The storage arrays 110 of system 100 include any number of registers (i.e., register files), such as floating point registers 112, integer registers 114, or other registers 116. Such registers may be analogous to those found on traditional processors for storing floating point and/or integer values during standard operation and may each contain any number of bits, such as 16, 32, or 64 bits. Various ones of registers 112 and 114 may be used in system 100 for storing floating point and/or integer values. Storage arrays 110 may also include other registers 116, such as accumulator registers, base registers, counter registers, general registers, instruction pointer registers, stack pointer registers, etc. The term "storage array" is not limited to registers, however, and generally connotes any suitable storage element. As but one example, in the illustrated embodiment, storage arrays 110 may also include one or more on-chip data caches 118, such as a level 1 (L1) data cache. Data cache 118 may include a plurality of cache lines (cache blocks), which may be used to cache data recently accessed by the processor or data near recently accessed data.

In some embodiments, the computer processor may include one or more execution cores, such as execution core 130 in processor 102. Execution core 130 may comprise any circuits, hardware units, and/or logic for implementing functionality to operate on data in storage arrays 110, data cache 140, and/or memory 150. For example, in one embodiment, execution core 130 includes arithmetic logic unit 132, which may comprise a digital circuit for performing arithmetic and/or logical operations on data in one or more of storage arrays 110. In various embodiments, a processor may contain any number of arithmetic logic units. An execution core, such as 130, may also include other logical units, such as any number of load, store, and/or store units 134 for retrieving and/or modifying data in memory 150 or in caches 118 or 140.

According to the illustrated embodiment, execution core 130 includes a Bloom filter unit 136 configured to implement Bloom filter logic. For example, Bloom filter unit 136 may provide logic configured to execute specialized instructions that insert a given value into a Bloom filter (i.e., designating the value as a member of an inserted set) and/or that query a Bloom filter to determine whether a given value is a member of the inserted set. In various embodiments, Bloom filter unit 136 may be implemented in various locations in the processor.

A Bloom filter may only be able to conclude definitively whether a given value is not a member of a set and not whether it definitively is a member of the set. Accordingly, for the purposes of this disclosure, when a Bloom filter or similar construct is said to determine that a given value is a member of a set, what is meant is that the Bloom filter could not determine that the given value was not a member of the set (i.e., the value could be a member of the set). Thus, even if a Bloom filter/set membership construct is said to determine that a given value is a member of a set, that determination may be in error.

Figure 2:
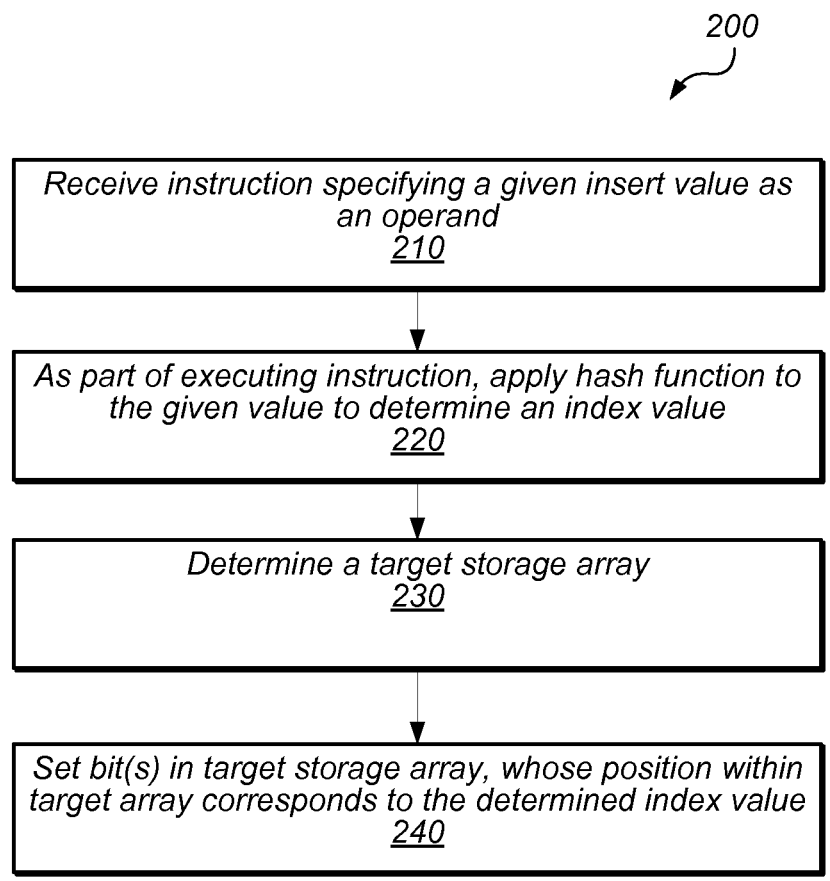
FIG. 2 is a flow diagram illustrating a method for inserting a given value into a filter denoting set membership using hardware support, according to various embodiments.

FIG. 2 is a flow diagram illustrating a method for inserting a given value into a filter denoting set membership using hardware support, according to various embodiments. The method of FIG. 2 may be executed by an appropriately configured computer processor, such as processor 102, which may utilize various functions of a Bloom filter unit, such as 136.

Method 200 begins when the processor receives an instruction specifying a given insert value as an operand, as in 210. For example, in some embodiments, the given value may be contained in a register that is specified by the operand. Receiving an instruction may be performed in response to an instruction pointer being incremented and may include fetching the instruction from memory or from an instruction cache.

As part of executing this instruction, the processor (and/or Bloom filter unit) may determine an index value based on the insert value, such as by applying a hashing function to the insert value, as in 220. As described later, in various embodiments, the hash function used may be chosen based on different criteria, such as based on a value indicated by another operand of the instruction. In some embodiments, executing the instruction may include deriving multiple index values, each calculated by applying a different hash function to the insert value.

According to method 200, the processor may determine a target storage array, such as one or more of storage arrays 110. In some embodiments, the target storage array may be identified as an operand to the instruction received in 210. In other embodiments, the step 230 (determining the target storage array) may be performed as part of executing a different instruction altogether. In such embodiments, the identity of the target storage array may be passed to the different instruction as an operand.

According to the illustrated embodiment, once the index value and the target storage array have been determined (as in 220-230), method 200 includes setting one or more bits in the target storage array whose position within the target storage array corresponds to the determined index value, as in 240. In some embodiments, setting the bit may include setting it to a sentinel value (e.g., 0 or 1) that is used to indicate that the bit is set. For example, if the target register is a 32-bit floating-point register and the index value is 12, then the bit at position 12 of the register may be set to the sentinel value (e.g., 1). It is assumed that before any insert operations are performed, all bits of the target storage array contain or are set to a value other than the sentinel value. As described in more detail below, in embodiments wherein a plurality of index values were calculated, a different target storage array may be determined for each index value and a bit corresponding to the respective index value may be set in each storage array.

Figure 3:
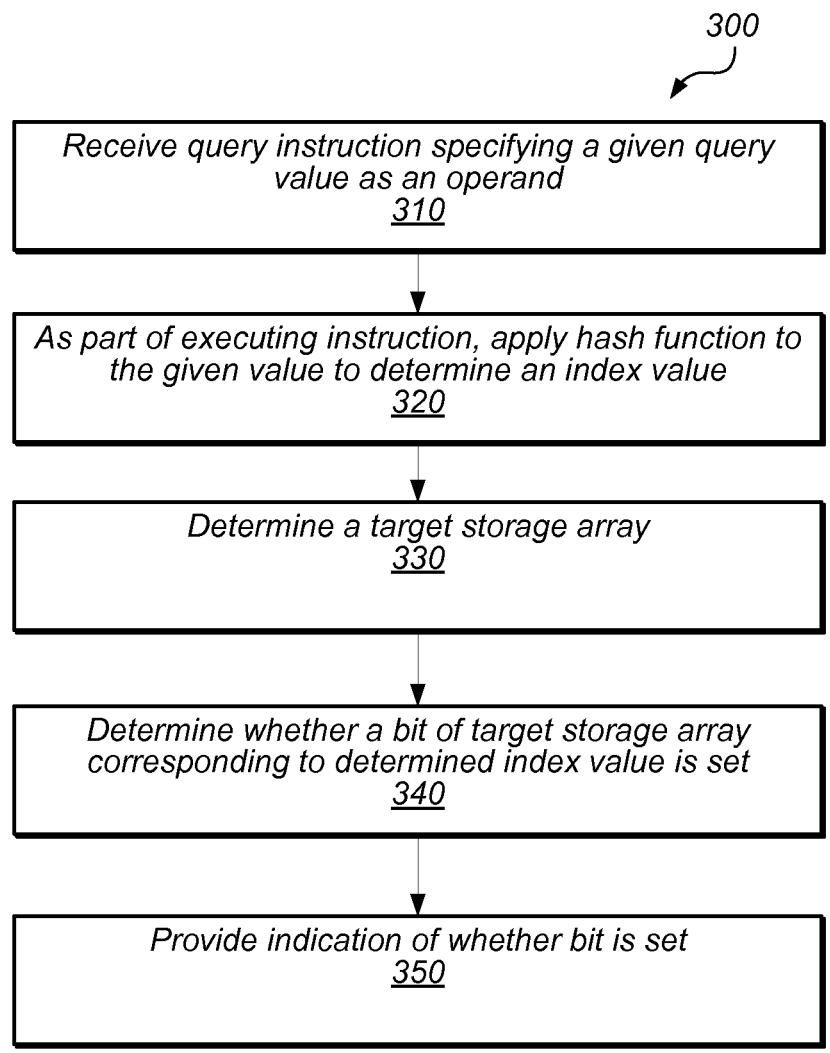
FIG. 3 is a flow diagram illustrating a method for determining whether a given value is a member of an inserted set, using architected instructions, according to various embodiments.

FIG. 3 is a flow diagram illustrating a method for determining whether a given value is a member of an inserted set, using architected instructions, according to various embodiments. The processor and/or Bloom filter unit may be configured to perform method 300 as part of executing one or more specialized Bloom filter query instructions.

Method 300 begins when the processor receives a query instruction specifying a given query value as an operand, as in 310. In some embodiments, the operand may indicate a register where the query value is stored.

As part of executing this instruction, the processor (and/or Bloom filter unit) may determine an index value based on the query value, such as by applying a hashing function to the query value, as in 320. In some embodiments, the same hashing function or functions used for performing the insert operation of FIG. 2 are also used for the query operation of FIG. 3. According to the illustrated embodiment, the processor may then determine a target storage array (as in 330), determine whether a bit of the target storage array whose position corresponds to the index value is set (as in 340), and provide an indication of this latter determination (as in 350). If the bit is not set, then the query value was not inserted and is therefore not an element of the inserted set.

In various embodiments, the insert and query methods of FIG. 2 and FIG. 3 respectively may be implemented by the processor in response to executing various instructions. For example, in some embodiments, the processor's ISA may include an instruction for adding a given element to a given Bloom filter, such as:

bfadd % rs1 % fs2 % rd     (1)

In instruction (1), bfadd is the name of the instruction, while % rs1, % fs2, and % rd are register operands. In various embodiments, each register operand may be of various types (e.g., floating point, integer) and may contain different numbers of bits (e.g., 16, 32, 64). The format of instruction (1) is an example of a bfadd instruction and other formats are possible.

Figure 4:
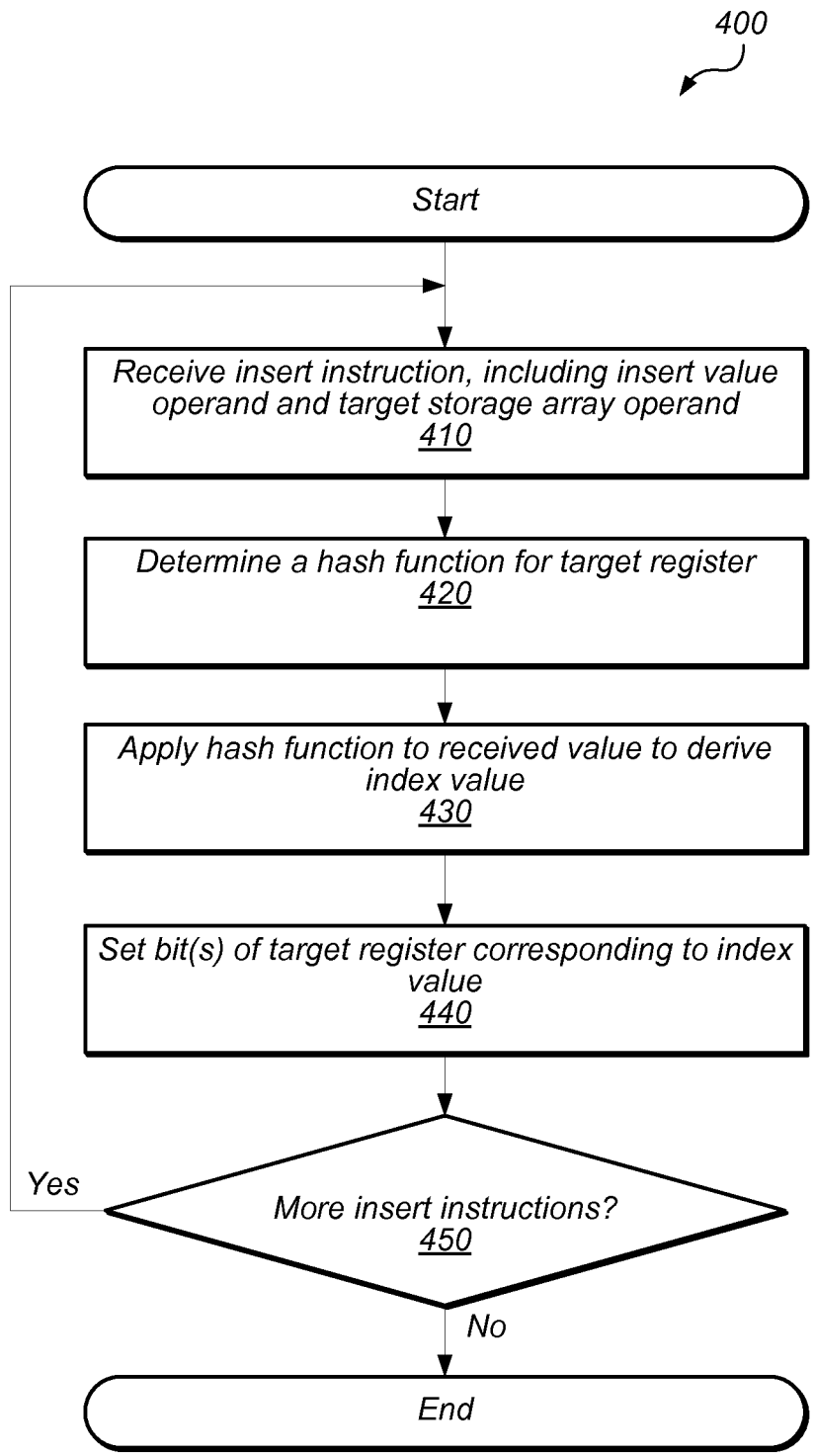
FIG. 4 is a flow diagram illustrating a method for inserting a value into a filter denoting set membership, using at least one architected insert instruction, according to some embodiments.

FIG. 4 is a flow diagram illustrating a method for inserting a value into a filter denoting set membership, using at least one architected insert instruction (e.g., bfadd), according to some embodiments.

Method 400 may begin when the processor receives an insert operation (e.g., bfadd) that includes an insert value operand and a target storage array operand, as in 410. This may correspond to the step of receiving an instruction specifying a given insert value as an operand, as in 210 of FIG. 2.

In some embodiments, an operand such as % rs1 may be a register that identifies the insert value. In some embodiments, the insert value may be stored in register % rs1, while in other embodiments, the value of % rs1 may identify a memory address where the insert value is stored.

In some embodiments, the instruction may include another operand, such as % fs2, to indicate the target storage array that contains the Bloom filter state. For example, % fs2 may be a register that contains the Bloom filter state. In other embodiments, % fs2 may be a register containing a memory address or other data usable by the processor to locate the target storage array containing the Bloom filter state. For example, if the Bloom filter state is contained in a target storage array in memory or in a privatized block of a data cache, then the value contained in % fs2 may be usable to locate this target storage array.

After the processor receives and/or decodes the insert instruction, as in 410, it may execute the instruction, as in 420-440. According to the illustrated embodiment, as part of executing the insert instruction, the processor may determine a hash function to use, as in 420. In some embodiments, the particular hashing function to use may be determined based, at least in part, on the identity of the target storage array identified by the operand of 410 that identifies the target storage array (e.g., % fs2). In some embodiments, the operation of the hashing function may be dependent on the target storage array or on the operand of 410 identifying the target storage array.

Given an input value, the hash function of 420 is configured to produce an output that is a valid index into the target storage array. For example, if the target storage array is a 32-bit register, then the hash function may output one of 32 values (e.g., one of 0-31), such that bit in the target storage array can be mapped to a respective index. In embodiments wherein the target storage array is a cache block, the hash function may determine an index of a bit in the cache block. In some embodiments, a one-to-one relationship may exist between indices and bits in the target storage array, while in others, multiple bits may map to the same index.

According to the illustrated embodiment, the processor may apply the hash function determined in 420 to the insert value received in 410, to derive an index value, as in 430. As described above, in some embodiments, the index value may constitute a valid index into the target storage array (i.e., an index within the bounds of target storage array). Next, the processor may set the bit (or bits) of the target storage array that map to the index value. For example, if the target storage array is a 32-bit register and the index value derived is 12, then step 440 may comprise setting the $12^{th}$ bit of the register to a sentinel value (e.g., 1).

In some embodiments, the insert instruction may include multiple target registers. For example, the bfadd instruction may take a form such as:

bfadd % rs1 % fs2 % fs3%rd     (2)

In some embodiments, an instruction that provides multiple target registers (such as (2)) may instruct the processor to perform the steps of 420-440 once for each target register. For example, a first hash function may be used to derive a first index value from the insert value and a second hash function may be used to derive a second index value from the insert value. Additionally, a bit of the first target storage array corresponding to the first index value is set and a bit of the second target storage array corresponding to the second index value is set.

In other embodiments, when multiple target storage arrays are specified, as in (2), the space of the arrays may be aggregated to act as one larger virtual filter. In such embodiments, a hash function with an output range as large as the virtual filter may be used. For example, in some embodiments, if two storage arrays are specified and each is a 32-bit register, then the two storage arrays may be combined into a 64-bit virtual filter and a hash function may be chosen in 420 that produces 64 different index values (e.g., 0-63). Various schemes may be used to map these index values to respective slots of each storage array. For example, values between 0-31 may be mapped to the first storage array while values between 32-63 are mapped to the second storage array. Thus, in 440, only the array containing the bit corresponding to the determined index value is updated.

In some situations, it may be desirable to use more storage registers than are possible to specify in a single instruction. To use additional registers, a software program may be configured (e.g., by a programmer and/or by a compiler) to include a plurality of insert operations, each identifying a different target storage array. If there are more insert instructions, as indicated by the affirmative exit from 450, then the processor may repeat steps 410-440 for the next insert instruction. However, since different insert instructions may specify different target storage arrays in 410, a different hash function may be determined in 420, and therefore, a different index value may be derived in 430 and marked in 440. In some embodiments, since the insert instructions operate on different target storage arrays, a processor may concurrently perform multiple insert instructions in parallel. In some embodiments, multiple processors (logical or physical) may concurrently perform multiple insert instructions in parallel.

As described above, in some embodiments, a target storage array may reside in a data cache, such as on-chip data cache 118 of FIG. 1. In such embodiments, a memory buffer may be used to store the Bloom filter. In some embodiments, the buffer could be a fully-aligned block of cache lines, which may be swapped into and out of main memory using existing cache protocols. However, in some embodiments, the block may be "privatized" to the processor using it, such that the privatized memory areas would not participate in cache coherency protocols and/or logic. That is, the privatized areas of the cache would not be considered in various memory-coherence activities such as store buffer, snoop, or global directory logic. The block of privatized memory used for the Bloom filter in such embodiments would essentially be removed from coherent virtual memory until a thread context switch. In some embodiments, a per-thread state register (e.g., a new Bloom Filter Base Register—BFBR), which is set either to null or to the address of the privatized block of memory may be used. In some embodiments, normal software stores to the memory addressed in this way would be undefined, so that a special hardware unit is able to cache its contents.

According to the illustrated embodiment of FIG. 4, after the processor has executed the one or more insert instructions, the insert value has been inserted into the Bloom filter and program execution may continue, as indicated by the negative exit from 450. In some embodiments, the instruction may return some status value (e.g., success) in a results register specified by another operand (e.g., % rd). In some embodiments, the status value may include a measure of the loading or available space in the target storage array, such as a count of clear bits. Later, the program may include one or more instructions to query the Bloom filter to determine if a given value (such as the inserted value) is a member of the inserted set (i.e., has been previously inserted).

Figure 5:
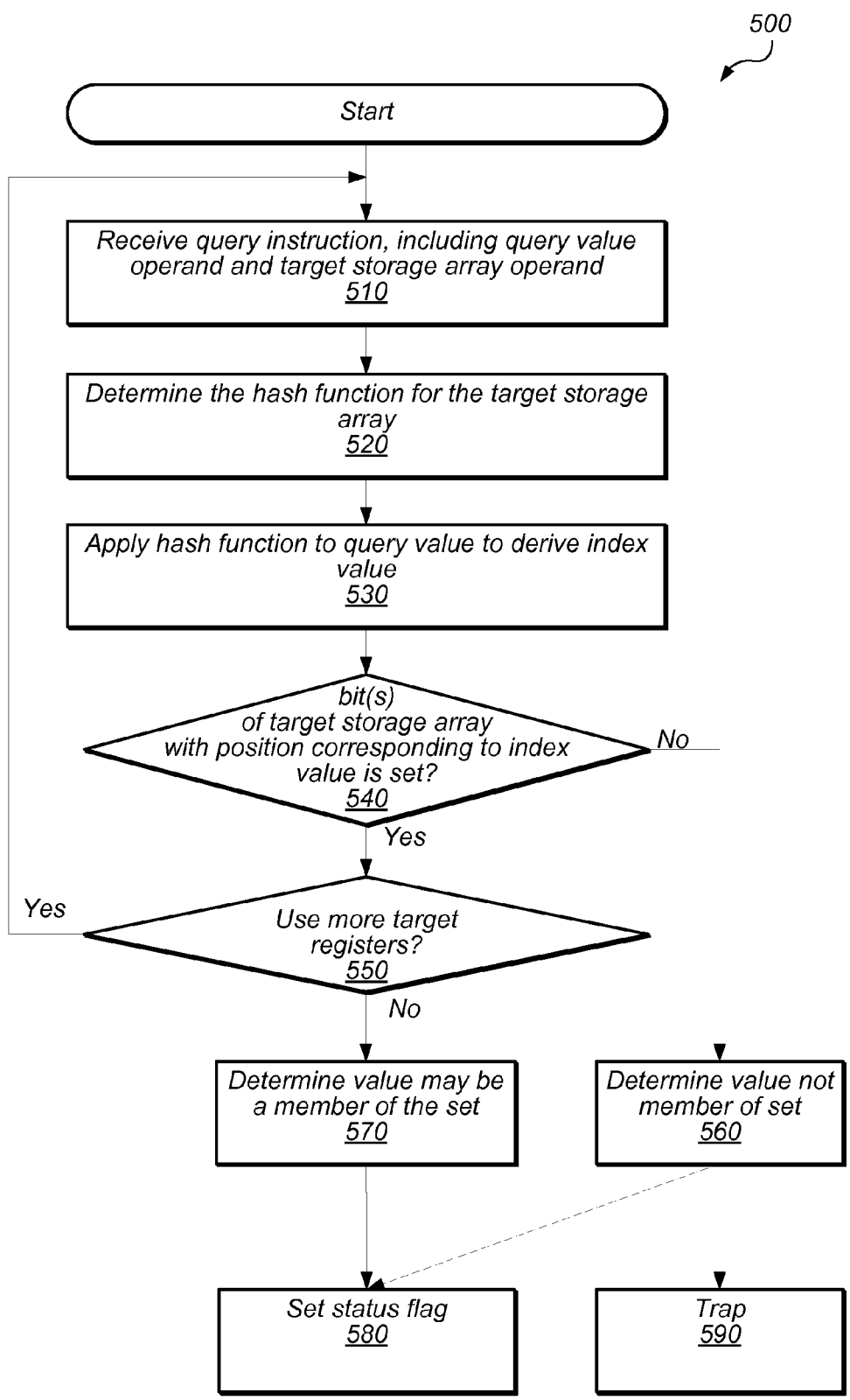
FIG. 5 is a flow diagram illustrating a method for querying a filter to determine set membership of a given value, using at least one architected query instruction, according to some embodiments.

FIG. 5 is a flow diagram illustrating a method for querying a filter to determine set membership of a given value, using at least one architected query instruction, according to some embodiments. A processor (e.g., processor 102 of FIG. 1) may execute method 500 during the course of program execution.

Method 500 begins when the processor receives a query instruction, including an operand indicating a query value and an operand indicating a target storage array, as in 510. For example, the following format may be used for a query instruction:

$$\text{bfquery } \%\text{ rs1 } \%\text{ fs2 } [\%\text{ fs3}] \%\text{ rd} \qquad (3)$$

As with the bfadd instructions of (1) and (2), different operands of a query instruction such as bfquery may represent different types of registers (e.g., floating point, integer, general purpose, etc.), each of various lengths (e.g., 16, 32, 64 bits). As before, one operand (e.g., % rs1) may specify the register holding the query value or holding the memory address where the query value is stored and another operand (e.g., % fs2) may specify the register that is the target storage array or that holds information usable to locate the target storage array (e.g., in a data cache). Optionally, additional operands (e.g., % fs3) may be included for specifying additional target storage arrays. As with the insert operation of bfadd, when multiple target storage arrays are specified, the multiple arrays may be treated as separate filters or aggregated into a single virtual filter.

According to the illustrated embodiment, method 500 then comprises determining the hash function that corresponds to the target register, as in 520. That is, the same hash function that was used by the insert function for determining indices of bits to set in the target storage array are the ones used by the query function to query that same target storage array. The query operation then applies the determined hash function to the received query value to derive an index value, as in 530, and determines whether a bit of the target storage array at an index corresponding to the determined index is set, as in 540.

According to the illustrated embodiment, if the bit is not set, as indicated by the negative exit from 540, then the processor may determine that the value is not a member of the inserted set (i.e., was not inserted using the target storage array), as in 560. In various embodiments, the processor may perform different actions in response to detecting that the value is not a member of the set. For example, in some embodiments, the processor may be configured to respond by generating a hardware interrupt and/or by trapping to an operating system kernel, as in 590. The operating system kernel may then perform some recovery code and/or branch to some application specific recovery code, which it may determine using a lookup table.

In other embodiments, the processor may respond to determining that the value is not a member of the inserted set (as in 560), by setting a status flag (as in 580). In various embodiments, a status flag may be set in a software readable register of the processor, in memory, or in any other software-accessible location.

In some embodiments, the software program may be designed (e.g., by a programmer and/or by a compiler) to include a plurality of query operations, each querying a different target storage array for the same query value. If there are more query instructions, as indicated by the affirmative exit from 550, then the processor may repeat steps 510-540 for the next query instruction. However, since different query instructions may specify different target storage arrays in 510, a different hash function (the one corresponding to the storage array) may be determined in 520, and therefore, a different index value may be derived in 530 and checked in 540. In instances in which query instructions operate on different target storage arrays, a processor may concurrently perform multiple query instructions in parallel.

In some embodiments, the processor may be configured to perform multiple query instructions (as indicated by the feedback loop from 550 to 510) without performing the conditional branch of 540 for each instruction. That is, instead of checking whether a bit at the determined index is set for each instruction and branching based on that determination (as in 540), the processor may be configured to aggregate the results of N query instruction executions and then to perform one branch based on the aggregated result. For example, the processor may keep a sticky bit initially set to 1 and then perform an AND operation using the value of the sticky bit and the value of the determined bit in each storage array, storing the result into the sticky bit. After all or a number of the query instructions have been executed (as indicated by the negative exit from 550), the processor may examine the value of the sticky bit to determine if any of the determined bits were not set. In this way execution flow control of the program is not dependent on the value of the sticky bit until multiple query instructions have been executed.

In some such embodiments, if the sticky bit is 0, then at least one of the determined bits was not set. In other embodiments, the sticky bit may be replaced with an accumulator or any other status register that can be used to store a value indicating whether any of the determined bits were not set. In some circumstances, performing a check and branch instruction, such as 540, only once for a group of query operations may be more time-efficient than performing the test once for each query instruction. Once the processor determines whether any of the determined bits are unset, execution may branch to 560 or 570 as appropriate.

As discussed above, using various combinations of insert and query instructions, such as bfadd and bfquery, it is possible for software to leverage hardware support to implement Bloom filters of different dimensions using different hash functions. For example, multiple bfadd operations may be aggregated to insert a given value into multiple storage arrays using various hash functions and multiple bfquery operations may be aggregated to determine if a given query value was previously inserted.

However, the dimensions of a Bloom filter constructed using instructions such as bfadd and bfquery as described above, may have some limits. For example, there may be a limit to the number of operands that a given instruction may have (e.g., due to a limited number of ports to a given register file) and therefore, in the embodiments described above, the width of a Bloom filter may sometimes be limited. For example, if in a given implementation, only two 64-bit registers may be specified in a single bfadd instruction, then the width of a virtual filter constructed from these two registers may be up to 128-bits wide. To create wider filters, several variations on the above embodiments are possible.

In some embodiments, instead of choosing a hash function that corresponds to a given target storage array and produces indices in the range of that target storage array, a hash function may be chosen independently of the target storage array (s) and may produce index values in an arbitrary range. For example, every architected instruction may use the same hash function or alternatively, one chosen based on a different operand or based on any other criteria. The chosen hash function may be configured to determine index values within an arbitrarily large range.

In such embodiments, different types of insert and query instructions (e.g., bfaddx and bfqueryx) may be configured to consider a target storage array as a segment of a larger virtual storage array. Such instructions may cause the processor to update a bit in the target storage array only if the determined index corresponds to a bit within the virtual array that is mapped to that particular target storage array.

Figure 6:
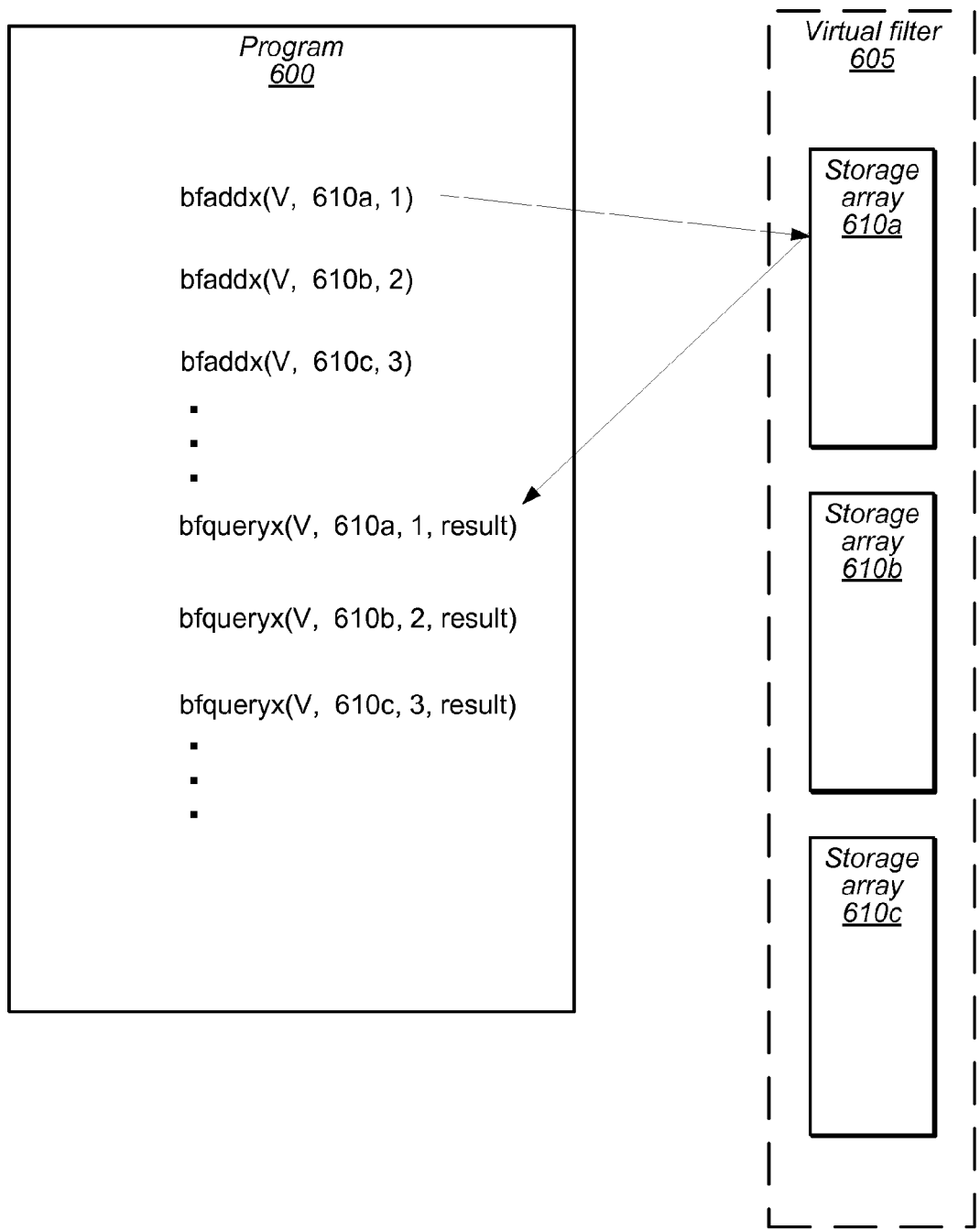
FIG. 6 is a block diagram illustrating the operation of a program using multiple architected instructions to determine set membership using multiple storage arrays, according to some embodiments.

FIG. 6 is a block diagram illustrating the operation of a program using multiple architected instructions to determine set membership using multiple storage arrays, according to some embodiments. In the illustrated embodiment, program 600 comprises at least six instructions, including three bfaddx instructions and three bfqueryx instructions. Each bfaddx instruction has at least three operands, each respectively indicating one of: an insert value V, a target storage array, and a segment identifier. In other embodiments, the instruction may have more or fewer operands. For example, one or more other operands may identify the hash function to use, an identifier for the virtual filter 605, or a parameter of the hash function to use (e.g, the number of or maximum value of indices calculated by the hash function).

In some embodiments, the bfaddx instruction may hash the given insert value (V) to determine an index value that is within the range of a virtual filter (such as 605), which may be composed of multiple storage arrays (such as 610*a*-610*c*). For example, if storage arrays 610*a*-610*c* are each 32-bit registers, then virtual filter 605 may be considered a 96-bit filter and the hash function used by the three bfaddx insert instructions may hash the insert value V to derive one of 96 possible index values (e.g., values between 0-95). Since the three insert instructions each operate on the same virtual filter 605, they each use the same hash function, and therefore derive the same index value given the same insert value V.

According to the illustrated embodiment, each bfaddx instruction may use the value of its segment operand to determine whether the derived index value corresponds to a bit in a portion of the virtual filter implemented by the target storage array indicated by the instruction's target array operand. As shown in the illustrated embodiment, since each insert instruction is using the same hash function and a different segment identifier, only one instruction determines that the derived index value is in its storage array and that instruction sets the bit (storage array 610*a* in FIG. 6). The other insert instructions, which determine that the index value does not correspond to a bit in their respective storage arrays 610*b* and 610*c*, need not set any bits.

In the illustrated embodiment of FIG. 6, program 600 includes three bfqueryx query instructions, which have analogous operands to the pictured bfaddx instructions, and which also have an operand specifying a result register for storing results of the query. Similarly to the bfaddx instruction, each bfqueryx instruction may cause the processor to apply the same hash function to the value V as was applied by each of the bfaddx insert operations. Thus, if the insert and query values are equal, then the index value of each of bfaddx and bfqueryx pictured would produce the same index value.

As with the bfaddx instructions, each bfqueryx instruction determines whether the index value corresponds to a bit in its portion of virtual filter 605. If so, then executing the bfqueryx instruction further includes determining if that bit is set. In FIG. 6, the bfqueryx instruction directed to segment 1 checks the status of the bit corresponding to the index value and updates the location identified by its result operand to reflect whether the checked bit is set. The subsequent two query operations determine that the index value does not correspond to a bit in segments 2 and 3 respectively, and therefore, need not update the result value.

In some embodiments, program 600 may include additional sets of bfaddx instructions for inserting value V into virtual filter 605, each set using a different hash function. To later query virtual filter 605 for a value inserted with multiple sets of bfaddx operations (each using a different hash function), a program may include analogous sets of bfqueryx operations, each set using a different one of the hash functions of the bfaddx operations. In some embodiments, the processor may perform multiple ones of the insert or query instructions (such as bfaddx and bfqueryx) in parallel. In some embodiments, the processor may perform multiple indexing, inserting, and/or querying operations in the course of executing a single bfaddx or bfqueryx instruction. In some embodiments, these multiple operations may be performed in parallel.

In some embodiments, rather than redundantly applying the same hash function for each add or query instruction in a set, the index value to be used by a set of instructions may be calculated once, stored (e.g., in a register), and used as an operand to each instruction in a given insert or query set. For example, in FIG. 6, an indexing operation that applies a hash function to V and saves the calculated index value in a register may precede the set of bfaddx instructions. Subsequently, each of the bfaddx instructions in the insert set may include the index value (or register containing the index value) as an operand. In such embodiments, a bfaddx instruction may not need to perform the hashing and therefore may not need the insert value as an operand.

In some embodiments, rather than calculating a single index at a time, a processor may support an architected instruction (e.g., bfindexvv) for calculating multiple indices from a given insert or query value by applying different hash functions to the value. In such embodiments, an index vector comprising multiple indices may be calculated (e.g., using bfindexvv) and stored (e.g., in a register) for use by subsequent updating instructions executable to set bits of one or more storage arrays at positions corresponding to the multiple indices.

Figure 7:
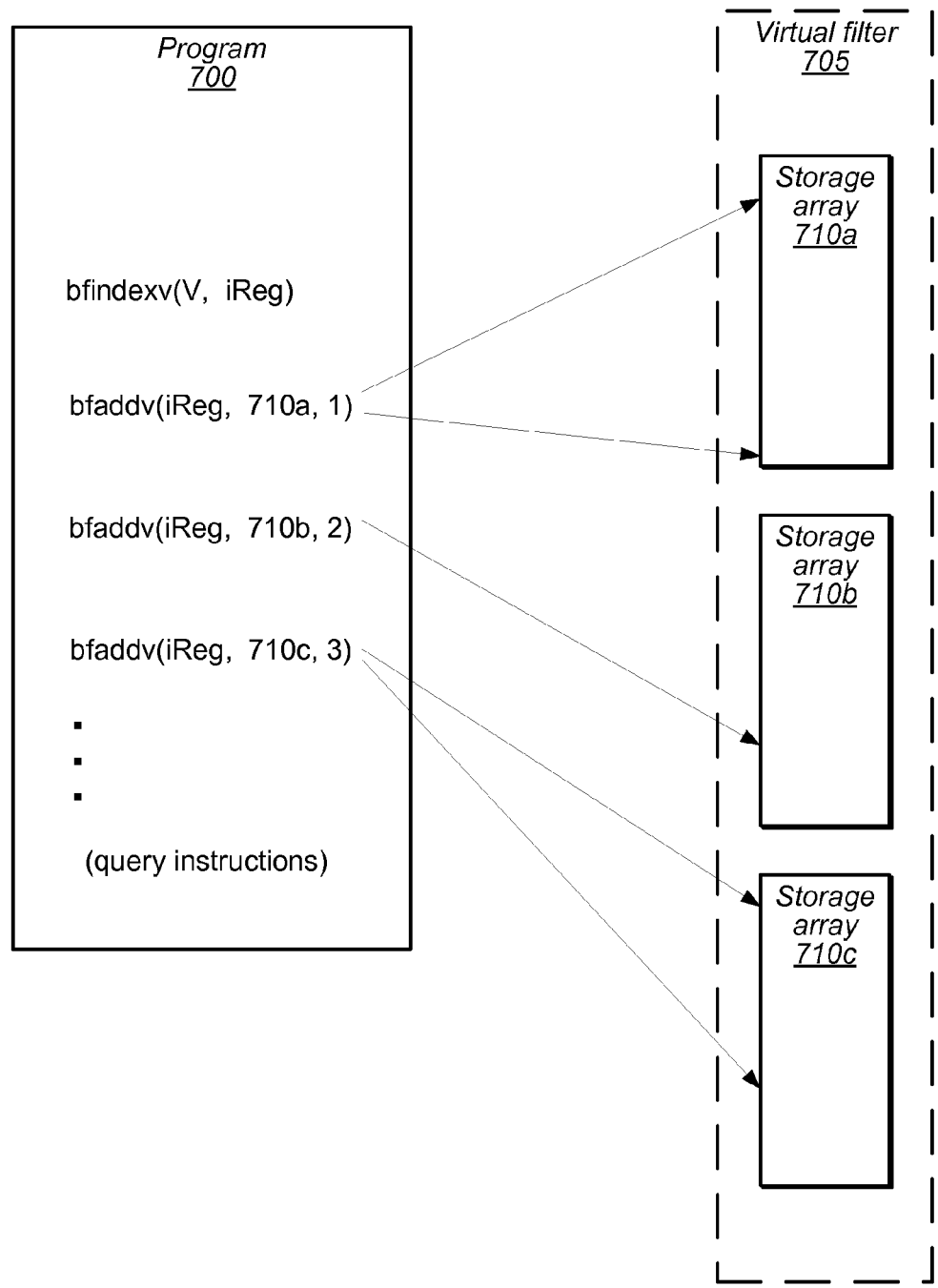
FIG. 7 is a block diagram illustrating the function of a computer program configured to utilize architected instructions for calculating an index vector and updating a virtual filter comprising multiple storage arrays, according to some embodiments.

FIG. 7 is a block diagram illustrating the function of a computer program configured to utilize architected instructions for calculating an index vector and updating a virtual filter comprising multiple storage arrays, according to some embodiments. In the illustrated embodiment, program 700 is configured to interact with a Bloom filter implemented by virtual filter 705, which is itself composed of storage arrays 710*a*-710*c* in a manner analogous to that of virtual filter 605.

In the pictured embodiment, program 700 comprises a bfindexvv instruction that includes an operand specifying an insert value (V) and another operand specifying a target register for storing the index vector (iReg). In some embodiments, executing the bfindexvv instruction may include applying different hash functions to the given value to derive different index values. This applying of different hash functions may be performed in parallel. Executing the instruction may further include storing those index values, or indications of those index values, in the result storage location (iReg). For example, in one embodiment, executing the bfindexvv instruction may include deriving N different indices by applying N different hash functions to the given insert value (V) in parallel and storing the N indices in a target register (iReg). In the illustrated embodiment, N is equal to at least five, though any suitable number may be used.

After calculating N indices and storing those indices in iReg, program 700 executes three instructions to update virtual filter 705. Each of the illustrated bfaddv instructions (Bloom filter add, vectorizing) targets a different one of the storage arrays of virtual filter 705 and updates any bit(s) within the storage array whose position within virtual filter 705 corresponds to an index specified in the index vector (iReg).

In various embodiments, each bfaddv instruction may include operands identifying the index vector (iReg), a respective target storage array (e.g., 710), and a segment identifier (or other information usable to determine a range of virtual filter indices to which the indices of the target storage array are mapped). For example, if each of storage arrays 710*a*-710*c* is a 32-bit register, then indices between 0-31 may be mapped to bits of storage array 710*a* (segment 1), 32-63 to bits of storage array 710*b* (segment 2), and 64-95 to bits of storage array 710*c* (segment 3). Thus, a bfaddv instruction, in one embodiment, might specify not only a particular virtual filter, but also a segment within that virtual filter.

In the illustrated embodiment, executing the bfaddv instruction directed at storage array 710*a* comprises determining that two indices identified by an iReg map to storage array 710*a*, and then setting those two bits. Likewise, one index maps to a bit of storage array 710*b* and two indices map to bits of storage array 710*c*; each of these bits are set as part of executing the two other bfaddv instructions.

Subsequent to performing the updates of the bfaddv instructions, program 700 may include various query instructions to query the virtual filter 705. In various embodiments, querying virtual filter 705 may be performed in various ways. For example, according to one embodiment, program 700 may include multiple bfqueryx instructions for querying virtual filter 705 for a given value (e.g., including one bfquery instruction corresponding to each storage array, as in program 600). In another embodiment, to query virtual filter 705 for a given value V, program 700 may re-execute a bfindexv instruction for the value V to recreate the index register (iReg) and then execute multiple bfqueryv (Bloom filter query, vectorized) instructions. In some embodiments, bfqueryv instructions may accept parameters analogous to those accepted by bfaddv instructions (e.g., index register, storage array, and segment identifier) and a results register to store the result of the query (i.e., whether all of the indices in the given index register that map to the given segment of virtual filter 705, and implemented by the given storage array, are set). Thus, as the combination of bfindexv and bfaddv instructions allows storage arrays in virtual filter 705 to be update without having to re-perform the hash functions for each of the storage arrays, the combination of bfindexv and bfqueryv instructions may allow those multiple storage arrays to be queried without having to re-perform the hash functions for each of the storage arrays.

Figure 8:
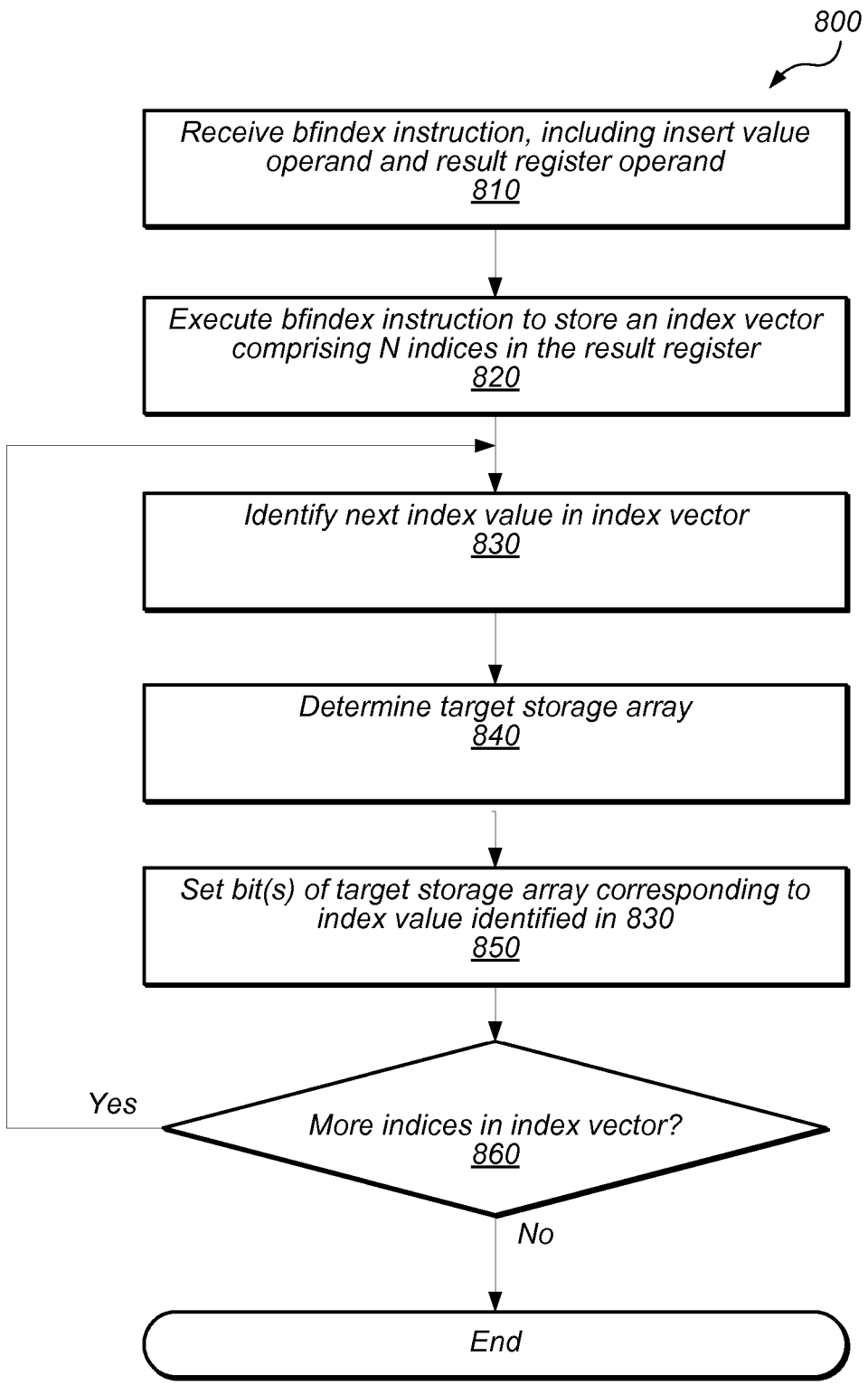
FIG. 8 is a flow diagram illustrating a method for updating a filter to denote that a given value is a member of a set, using architected instructions including an index vector calculating instruction, according to some embodiments.

FIG. 8 is a flow diagram illustrating a method for updating a filter to denote that a given value is a member of a set, using architected instructions including an index vector calculating instruction, according to some embodiments. Method 800 may be performed by a processor executing a program including bfindexv, e.g., program 700.

According to the illustrated embodiment, method 800 begins with the processor receiving a bfindexv instruction (or comparable index vector calculation instruction), as in 810. In some embodiments, bfindexv may include at least one operand specifying the insert/query value and another specifying a location in which to store the resulting index vector, as in 810.

Method 800 then includes executing the bfindexv instruction, as in 820. Executing the instruction may include applying different hash functions to the given value to derive different index values and storing those index values, or indications of those index values, in the result storage location specified in 810. In some embodiments, executing the bfindexv instruction (as in 820) may include deriving multiple indices in parallel, such as by applying each of the N hash functions in parallel and storing each resulting index value in the index register.

In various embodiments, the number of indices calculated by bfindexv may be fixed or determined by an operand of the bfindexv instruction. In addition, the particular hash functions used and/or the range of indices produced by the hash functions may be fixed in hardware or determined by an operand of the bfindexv instruction.

According to the illustrated embodiment of FIG. 8, the processor may identify the next index value in the index vector (as in 830), determine a target storage array (as in 840), and set any bit(s) of the target storage array that correspond to the identified index value (as in 850). Setting the corresponding bit(s) may include determining a mapping between the index value (which may refer to a virtual filter) and an index of the target storage array. In some embodiments, the changes to the target storage array may be carried out directly by the bfindexvv instruction, as described above. In other embodiments, the changes to the target storage may be carried out by a separate instruction such as bfaddv.

If the index vector contains additional indices, as in the affirmative exit from 860, the processor may repeat steps 830-850 for each of the other indices. This is indicated by the feedback loop from 860 to 830. In method 800, once updates have been performed for each index (as indicated by the negative exit from 860), the update operation is complete. In some embodiments, the iterations of 830-850 may be performed in parallel.

Figure 9:
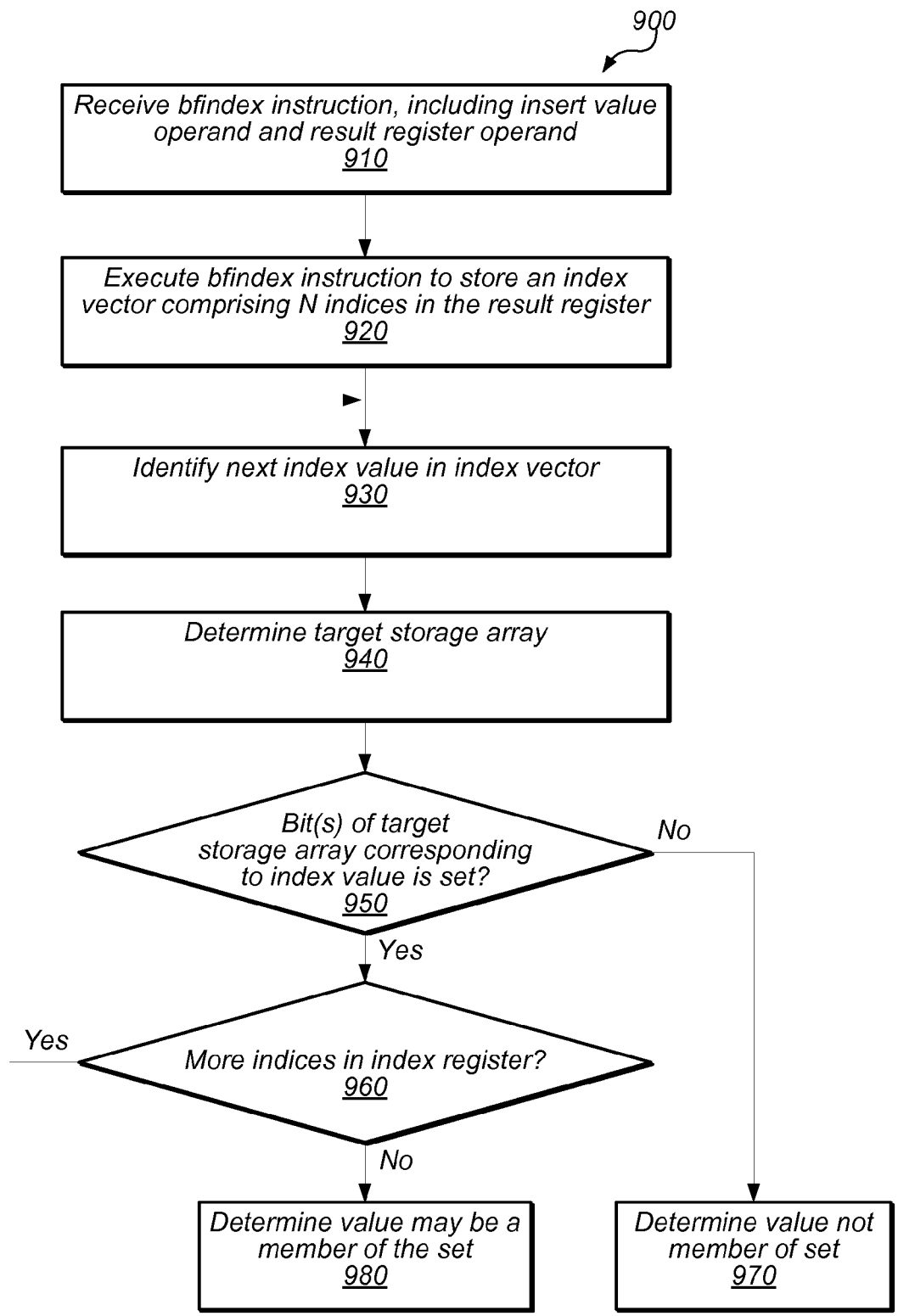
FIG. 9 is a flow diagram illustrating a method for performing a query operation using architected instructions including an index vector calculating instruction, according to some embodiments.

FIG. 9 is a flow diagram illustrating a method for performing a query operation using architected instructions including an index vector calculating instruction, according to some embodiments. Method 900 may be performed by the processor to query a Bloom filter for a value that may be been inserted using method 800 of FIG. 8.

According to the illustrated embodiment, method 900 begins by executing the same bfindexv instruction (or comparable instruction) executed in method 800. The processor may receive the instruction, as in 910 and then execute it, as in 920, to store an index vector comprising N indices into a results register. Executing bfindexv as part of method 900 may comprise applying the same hash functions to the query value that were applied to the insert value in method 800. Therefore, if the insert value is equal to the query value, then the output index vector of 920 matches the output index vector of 820.

The method may then comprise determining whether any bit corresponding to an index of the index vector is not set. As shown in FIG. 9, this process may include identifying the next index value in the index vector (as in 930), determining a target storage array (as in 940), which may be specified as an operand to one or more instructions, and determining whether a bit of the target storage array, whose position corresponds to the index value, is set (as in 950).

According to method 900, if the bit not set (as indicated by the negative exit from 950), then the system determines that the query value is not a member of the set (as in 970). The processor may be configured to perform various actions in response to this determination, such as setting a status bit and/or trapping to the operating system kernel.

However, if the bit is set, as indicated by the affirmative exit from 950, then if more indices exist in the index vector (as indicated by the affirmative exit from 960), then the processor may continue to check the remaining indices, as indicated by the feedback loop from 960 to 930. Once all indices have been checked, as indicated by the negative exit from 960, then the system may determine that the given query value may be a member of the set, as in 980. That is, the system does not determine in 980 that the value is definitely a member of the inserted set, but only that it may be.

In different embodiments, many of the variations described for FIG. 5 may be applied to method 900. For example, instead of checking whether a bit at the determined index is set for each index and branching based on that determination (as in 950), the processor may be configured to aggregate the results using a sticky bit and then perform a single conditional branch. As discussed above, in response to determining that the query value is not a member of the inserted set, the processor may be configured to perform different actions, such as trapping to a kernel/operating system, or setting one or more software readable flags, etc.

In various embodiments, storage arrays holding filter data may be implemented by processor registers (e.g., floating point register file, integer register file), as part of an on-chip data cache (e.g., L1 data cache), and/or as part of one or more higher-level data caches (e.g., L3). In some embodiments where storage arrays in higher-level data caches are used, a processor may be configured to issue insert and/or query instructions to hardware mechanisms coupled to the data cache in an asynchronous manner. For example, in some embodiments, an insert operation may include issuing a pseudo-store operation targeting a given memory address and a query operation may include issuing a pseudo-load operation to the given memory address. In some such embodiments, dedicated hardware may perform the pseudo-load and/or pseudo-store operations while the processor continues to do other work. Such asynchronous operation may help mask the typically long access latencies to higher-level data cache, such as L3, where the filter data is stored.

Figure 10:
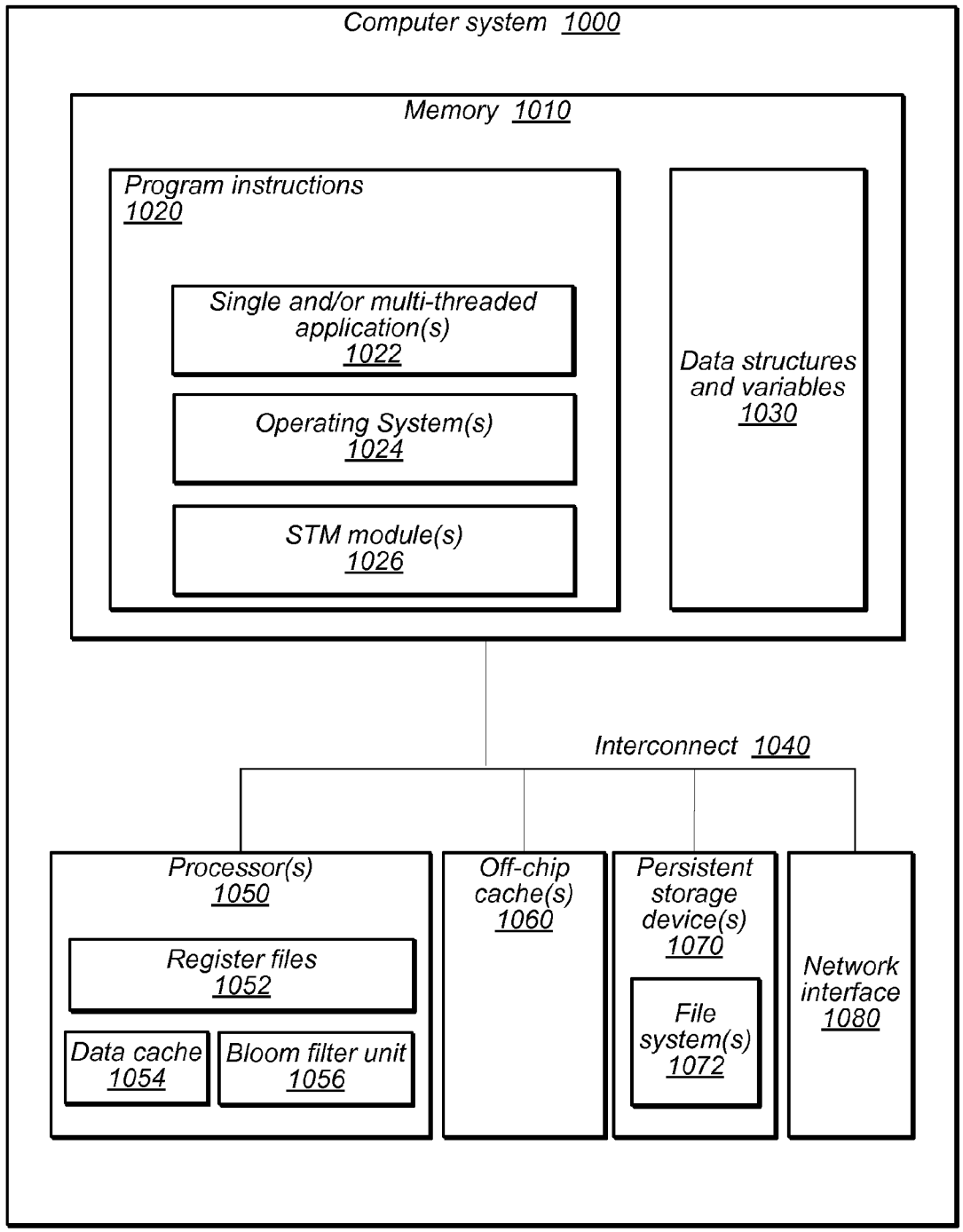
FIG. 10 illustrates a computer system configured to implement set membership determination functionality using architected instructions, as described herein, according to some embodiments.

FIG. 10 illustrates a computer system configured to implement set membership determination functionality using architected instructions, as described herein, according to some embodiments. Computer system 1000 may be any of various types of devices, including, but not limited to, a personal computer system, desktop computer, laptop or notebook computer, mainframe computer system, handheld computer, workstation, network computer, a consumer device, application server, storage device, a peripheral device such as a switch, modem, router, etc, or in general any type of computing device.

Computer system 1000 may include one or more processors 1050, each of which may include multiple cores, any of which may be single or multi-threaded. As described herein an in FIG. 1, each processor may comprise multiple storage arrays, such as register files 1052 and data cache 1054. Processor 1050 may further include a Bloom filter unit for supporting and/or performing any of the Bloom filter functionality described herein.

In the illustrated embodiment, the computer system 1000 may also include one or more off-chip caches 1060, such as an L2 or L3 cache. Computer system 1000 may also include persistent storage devices 1070 (e.g. optical storage, magnetic storage, hard drive, tape drive, solid state memory, etc), which may store data organized by a file system such as 1072. Computer system 1000 may also include one or more network interfaces, such as 1080, for transmitting and receiving data over any number of networks. Computer system 1000 may also include one or more memories 1010 (e.g., one or more of cache, SRAM, DRAM, RDRAM, EDO RAM, DDR 10 RAM, SDRAM, Rambus RAM, EEPROM, etc.). Various embodiments may include fewer or additional components not illustrated in FIG. 10 (e.g., video cards, audio cards, additional network interfaces, peripheral devices, a network interface such as an ATM interface, an Ethernet interface, a Frame Relay interface, etc.)

The one or more processors 1050, storage device(s) 1040, off-chip cahes 1060, persistent storage devices 1070, network interface 1080, and system memories 1010 may be coupled through system interconnect 1040. One or more of the system memories 1010 may contain program instructions 1020 and various data structures and variables 1030. Program instructions 1020 may be encoded in platform native binary, any interpreted language such as Java™ byte-code, or in any other language such as C/C++, Fortran, etc or in any combination thereof.

Program instructions 1020 may include program instructions executable to implement one or more single and/or multi-threaded programs 1022, which may use one or more architected instructions for implementing Bloom filter functionality, as described herein. For example, applications 1022 may include programs such as 600 and/or 700.

According to the illustrated embodiment, memory 1010 may comprise program instructions executable to implement an operating system 1024, such as Windows™ and/or Linux. In some embodiments, operating system 1024 may include a kernel for detecting and/or trapping hardware interrupts and/or software signals that may arise during the course of execution, as described herein.

In some embodiments, program instructions 1020 may include various mechanisms for implementing software transactional memory, such as STM modules 1026. In some embodiments, STM modules may utilize architected instructions for implementing Bloom filter functionality, as described herein. For example, using various ones of the architected instructions described herein, STM modules 1026 may track read/write sets of active transactions by inserting each such memory address into a Bloom filter. When the processor receives a cache coherence probe regarding a given memory address, STM modules 1026 may utilize ones of the architected instructions disclosed herein to determine whether the given memory address is a member of the read/write set being tracked.

The software programs (e.g., 600 and 700) described herein and configured to utilize various architected instructions for implementing Bloom filter technology may be provided as a computer program product, or software, that may include a computer-readable storage medium having stored thereon instructions, which may be used to program a computer system (or other electronic devices) to perform a process according to various embodiments. A computer-readable storage medium may include any mechanism for storing information in a form (e.g., software, processing application) readable by a machine (e.g., a computer). The machine-readable storage medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other form of propagated signal (e.g., carrier waves, infrared signals, digital signals, etc.)

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed:

1. A computer processor, comprising:
a plurality of storage arrays, each configured to store a respective one of a plurality of segments for a data structure, wherein each segment includes a plurality of bits, wherein each bit corresponds to a respective position within the data structure;
an execution core configured to store, in the data structure, an indication that a given value is a member of a set of values by executing an architected instruction having a first operand specifying the given value, a second operand identifying one of the plurality of storage arrays as a target storage array, and a third operand specifying one of the plurality of segments, wherein said executing includes:
applying a hash function to the given value to determine an index value; and
setting a bit in the target storage array, wherein the position of the set bit within the target storage array corresponds to the determined index value and the specified segment.

2. The computer processor of claim 1, wherein the target storage array includes a register of the processor.

3. The computer processor of claim 1, wherein the target storage array includes a data cache of the processor.

4. The computer processor of claim 1, wherein the execution core is further configured to determine whether a query value is a member of the set, including by executing a second instruction, the second instruction including an operand specifying the query value, wherein said executing the second instruction includes:
applying the hash function to the query value to determine a query index value;
determining the target storage array; and
determining whether a bit of the target storage array at a position corresponding to the query index value is set.

5. A computer processor, comprising:
a plurality of storage arrays, each configured to store a respective one of a plurality of segments for a data structure, wherein each segment includes a plurality of bits, wherein each bit corresponds to a respective position of the data structure;
an execution core configured to provide an indication of whether a given query value is a member of a set of values, including by executing an architected instruction having a first operand specifying the query value, a second operand identifying one of the plurality of storage arrays as a target storage array, and a third operand specifying one of the plurality of segments, wherein said executing includes:

applying a hash function to the query value to determine an index value;

determining whether a bit in the target storage array is set, wherein the position of the bit within the target storage array corresponds to the determined index value and the specified segment; and providing an indication of whether the query value is a member of the set of values, wherein the indication is dependent on whether the bit is set.

6. The computer processor of claim 5, wherein the plurality of storage arrays includes floating point registers.

7. The computer processor of claim 5, wherein the hash function is one of a plurality of hash functions applied to the query value to determine a plurality of index values and wherein said providing an indication of whether the query value is a member of the set further comprises:

determining at least two of the plurality of storage arrays;

for each of the index values, determining whether it is set, including by determining a whether a bit of one of the storage arrays is set, wherein the position of the bit corresponds to the index value; and wherein the indication indicates whether any of the index values are not set.

8. A non-transitory computer-readable storage medium having stored thereon instructions executable by a computer system, wherein the instructions comprise:

a first instruction executable by a computer processor of the computer system, the computer processor having a plurality of storage arrays configured to store a data structure to designate a given value as a member of a set of values, wherein each of the plurality of storage arrays is configured to store a respective one of a plurality of segments of the data structure, wherein the first instruction includes a first operand identifying the given value, a second operand identifying one of the plurality of storage arrays as a target storage array, and a third operand specifying one of the plurality of segments, wherein the first instruction is executable to:

apply a hash function to the given value to determine an index value; and set a bit of the target storage array at a position within the target storage array corresponding to the index value and the specified segment.

9. The computer-readable storage medium of claim 8, wherein the storage medium stores a second set of one or more program instructions, the second set being executable by the computer processor to determine whether a given query value is not a member of the set of values, wherein the second set of instructions comprises:

a query instruction including an operand identifying the query value and another operand identifying the target storage array, wherein the query instruction is executable to:

apply the hash function corresponding to the target storage array to determine a respective index into the target storage array;

determine whether a bit at the index of the target storage array is set; and in response to the bit not being set, indicate that the query value is not a member of the set of values.

10. The computer-readable storage medium of claim 9, wherein said indicating that the query value is not a member of the set of values comprises setting a status bit in the processor.

11. The computer-readable storage medium of claim 9, wherein said indicating that the query value is not a member of the set of values comprises trapping to an operating system.

12. The computer-readable storage medium of claim 9, wherein the second set of instructions comprises a plurality of architected query instructions, each including an operand identifying the query value and another operand identifying a respective one of the target storage arrays.

13. The computer-readable storage medium of claim 12, wherein said indicating that the query value is not a member of the set of values comprises setting a status bit in a register of the processor and wherein flow control of the computer program does not depend on the value of the status bit until after multiple ones of the second set of instructions are executed.

14. The computer-readable storage medium of claim 8, wherein the instructions further comprise:

a second instruction that is an architected instruction executable by the processor to apply a plurality of hash functions to a given value to determine a plurality of index values and to store the plurality of index values as an index array in one or more of the plurality of storage arrays.

15. The computer-readable storage medium of claim 8, wherein the storage medium stores a second set of one or more program instructions, the set being executable by the computer processor to determine whether a given query value is a member of the set of values, wherein the second set of instructions comprises:

an architected query instruction that includes an operand identifying the query value and another operand identifying one of the target storage arrays, wherein the query instruction is executable by the computer processor to:

apply the hash function corresponding to the target storage array to the query value to determine an index into the target storage array; and provide an indication of whether the query value is a member of the set, including by determining whether a bit of the target storage array at the determined index is set.

* * * * *

UNITED STATES PATENT AND TRADEMARK OFFICE
CERTIFICATE OF CORRECTION

| | | |
|---|---|---|
| PATENT NO. | : 8,788,766 B2 | Page 1 of 1 |
| APPLICATION NO. | : 12/708376 | |
| DATED | : July 22, 2014 | |
| INVENTOR(S) | : Rose et al. | |

It is certified that error appears in the above-identified patent and that said Letters Patent is hereby corrected as shown below:

In the Specification

In column 6, line 64, delete "bfadd % rs1 % fs2 % fs3%rd" and insert -- bfadd % rs1 % fs2 % fs3 % rd --, therefor.

In column 15, line 10, delete "cahes" and insert -- caches --, therefor.

Signed and Sealed this
Twenty-fourth Day of February, 2015

Michelle K. Lee
*Deputy Director of the United States Patent and Trademark Office*